United States Patent [19]

Halm

[11] Patent Number: 5,651,158
[45] Date of Patent: Jul. 29, 1997

[54] TOOTHBRUSH WITH RESILIENTLY FLEXIBLE HEAD

[75] Inventor: Hans Halm, Herne, Germany

[73] Assignee: Lingner & Fischer GmbH, Germany

[21] Appl. No.: 437,759

[22] Filed: May 9, 1995

Related U.S. Application Data

[63] Continuation of Ser. No. 306,842, Sep. 14, 1994, abandoned, which is a continuation of Ser. No. 122,408, filed as PCT/EP92/00696, Mar. 25, 1992, abandoned.

[30] Foreign Application Priority Data

Mar. 27, 1991 [GB] United Kingdom ............ 9106511
Mar. 25, 1992 [EP] European Pat. Off. ......... PCT/EP92/006966

[51] Int. Cl.[6] ........................................ A46B 9/04
[52] U.S. Cl. ........................... 15/167.1; 15/172; 15/201
[58] Field of Search ........................ 15/167.1, 167.2, 15/172, 201

[56] References Cited

U.S. PATENT DOCUMENTS

| | | | |
|---|---|---|---|
| 2,003,243 | 5/1935 | Campbell et al. | 15/167.1 |
| 2,172,624 | 9/1939 | Robert | 15/167.1 |
| 2,254,365 | 9/1941 | Griffith et al. | 15/167.1 |
| 2,266,195 | 12/1941 | Hallock | 15/167.1 |
| 2,428,268 | 3/1947 | Bressler | 15/167.1 |
| 2,676,350 | 4/1954 | Bressler . | |
| 2,807,820 | 10/1957 | Dinhofer | 15/167.1 |
| 3,188,672 | 6/1965 | Gary . | |
| 4,488,328 | 12/1984 | Hyman . | |
| 4,691,405 | 9/1987 | Reed | 15/167.1 |
| 4,712,267 | 12/1987 | Cheng | 15/167.1 |
| 5,054,154 | 10/1991 | Schiffer et al. . | |
| 5,114,214 | 5/1992 | Barman | 15/167.2 |

FOREIGN PATENT DOCUMENTS

| | | | |
|---|---|---|---|
| 442832 | 9/1912 | France . | |
| 2652245 | 3/1991 | France | 15/167.1 |
| 1233821 | 2/1967 | Germany . | |

*Primary Examiner*—Tony G. Soohoo
*Attorney, Agent, or Firm*—Nora Stein-Fernandez; Janice E. Williams; Edward T. Lentz

[57] ABSTRACT

A toothbrush having a handle and at one end having a bristle-bearing head which is in the form of one or more segments which are flexibly and/or resiliently linked to each other. Optionally, the head may also be flexibly and/or resiliently linked to the handle. The grooves between the linked segments of the head are wholly or partly filled with an elastomeric material. In one aspect, the bristle-bearing head of the toothbrush is attached to the handle by a frame which wholly or partly surrounds the head and is an integral extension of the handle.

12 Claims, 5 Drawing Sheets

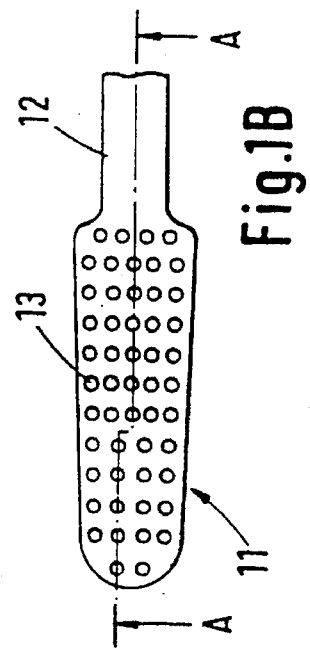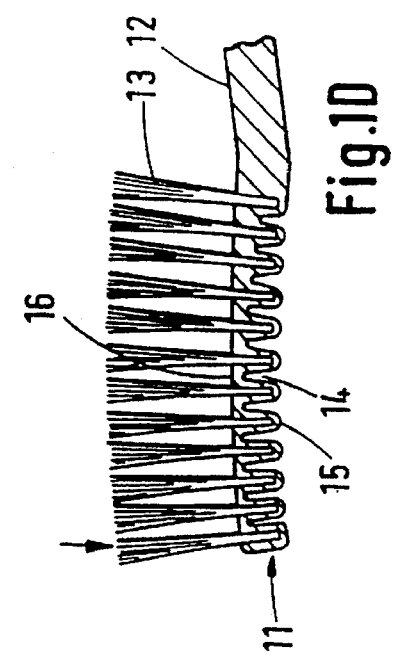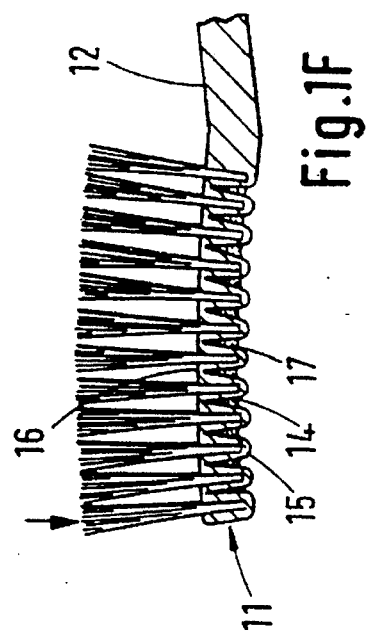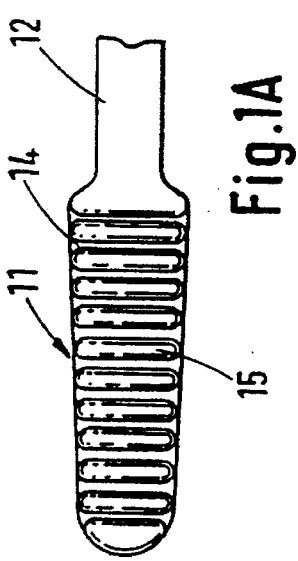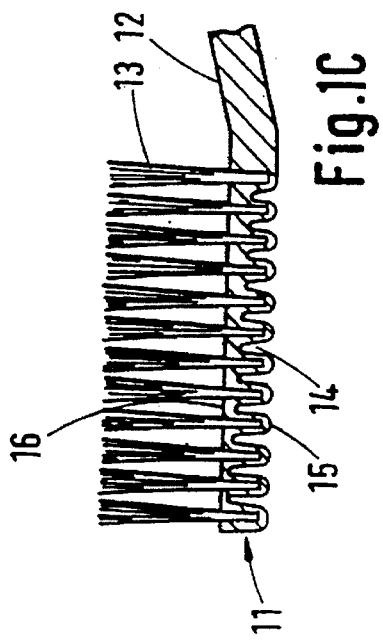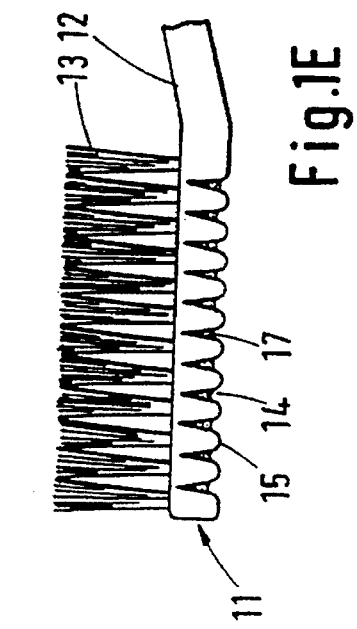

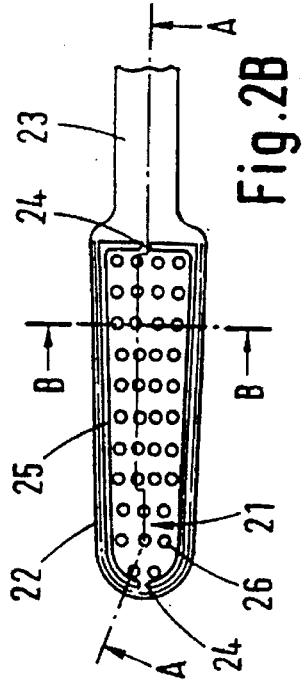
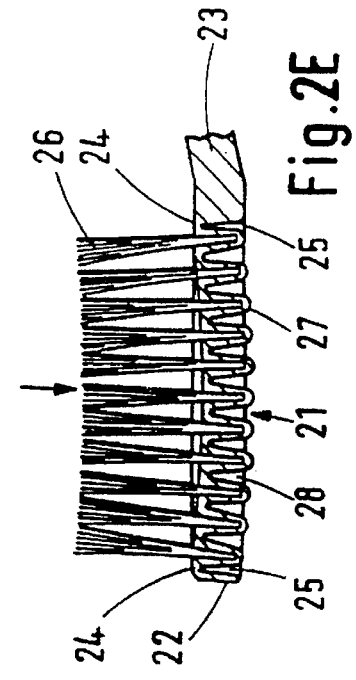
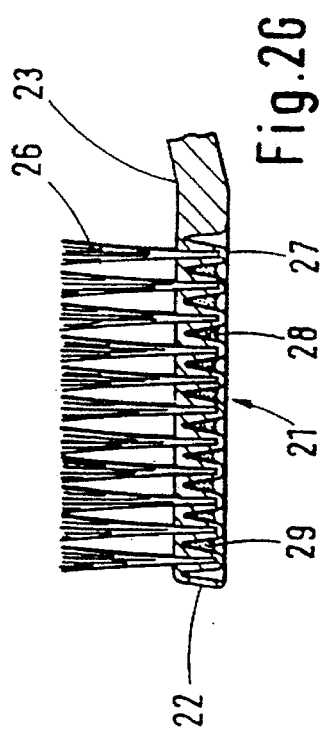
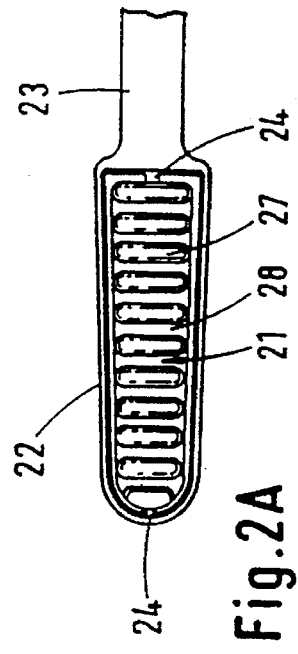
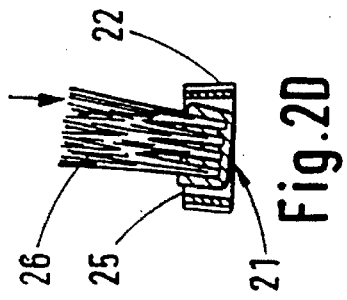
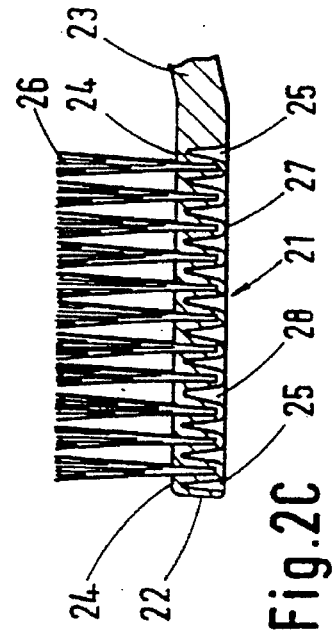
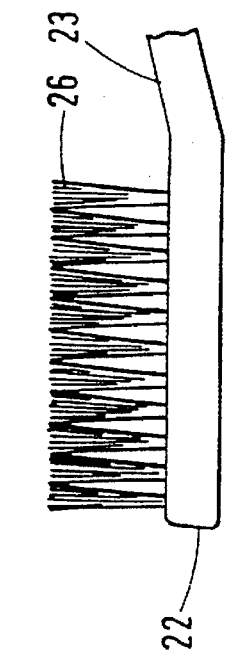

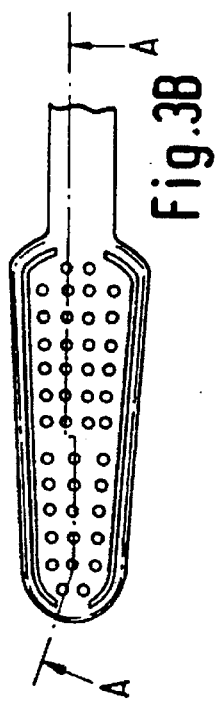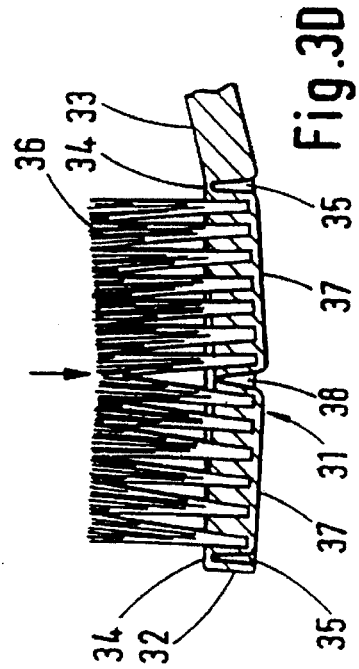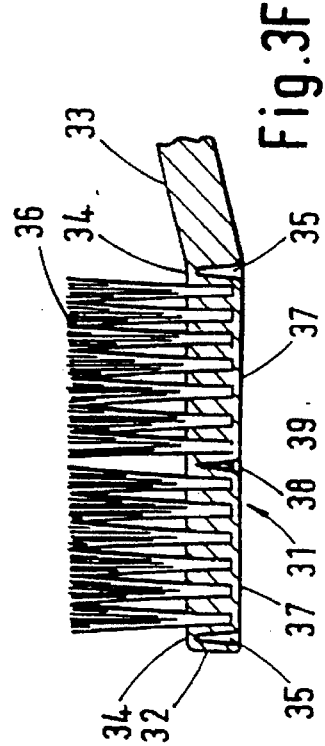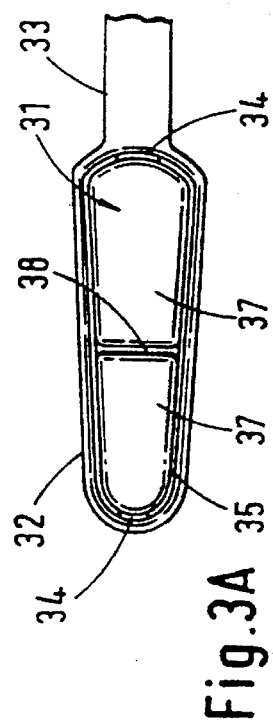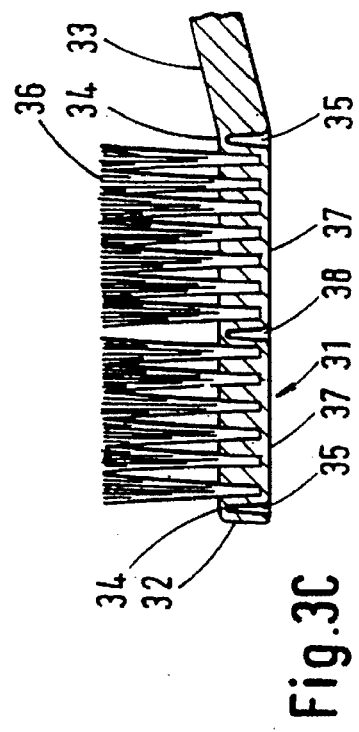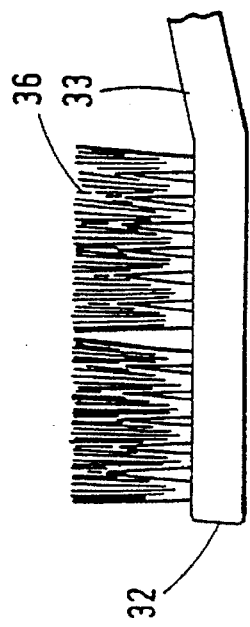

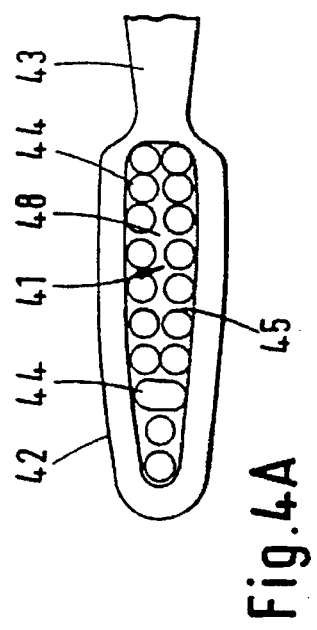
Fig.4A
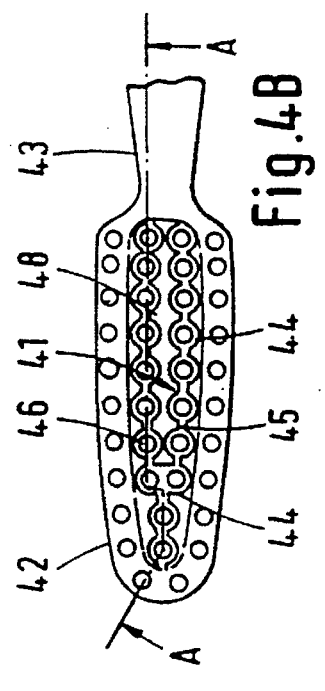
Fig.4B
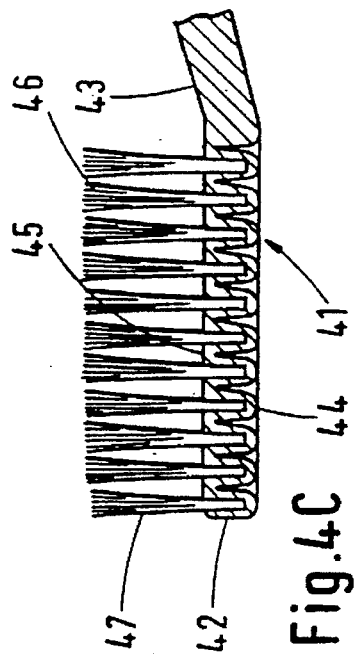
Fig.4C
Fig.4D
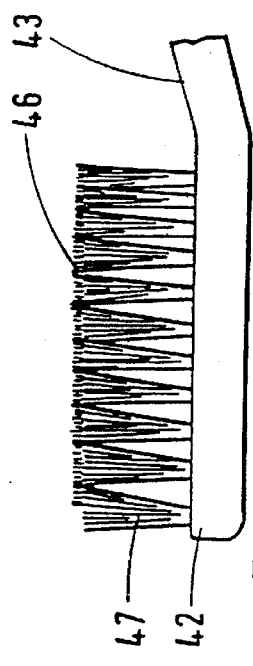
Fig.4E
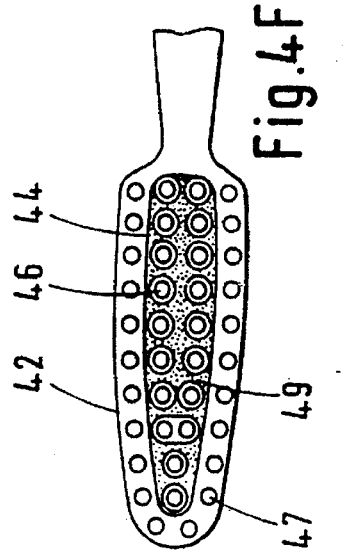
Fig.4F

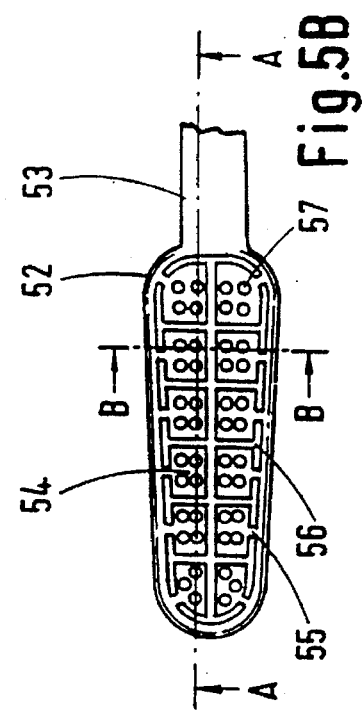
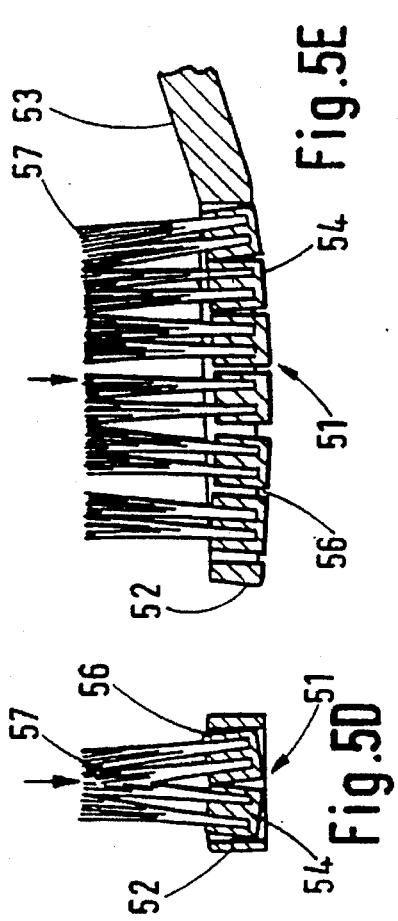
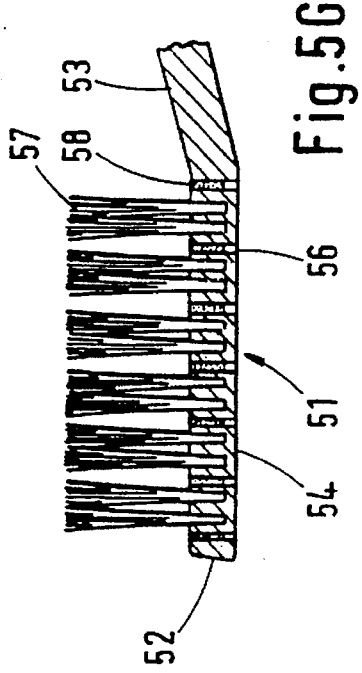
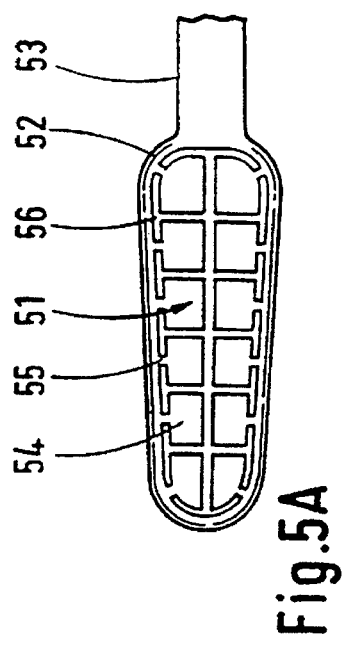
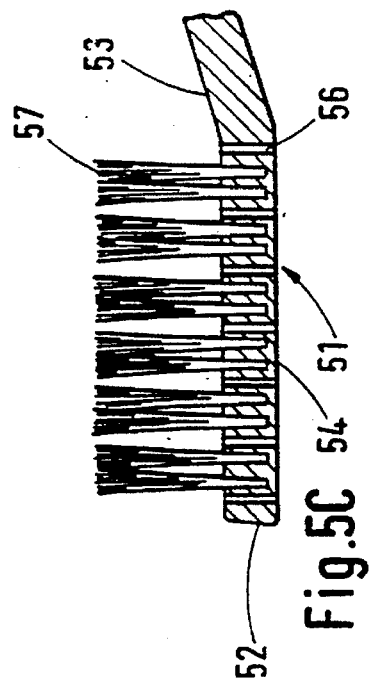
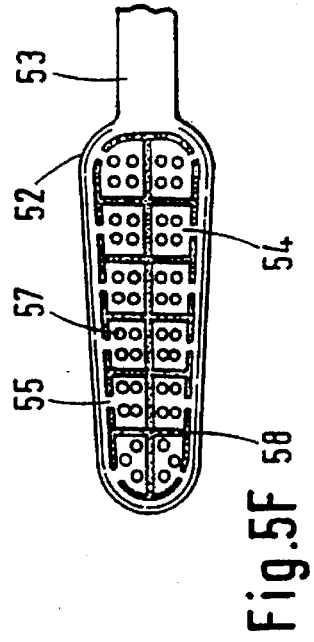

TOOTHBRUSH WITH RESILIENTLY FLEXIBLE HEAD

This is a continuation of application Ser. No. 08/306,842, filed Sep. 14, 1994, now abandoned, which is a continuation of 08/122,408, filed Sep. 27, 1993 now abandoned, which is a 371 of PCT/EP92/00696, filed Mar. 25, 1992.

The present invention relates to a novel article, being a toothbrush, and in particular to a toothbrush having a flexible zone in its head.

When brushing one's teeth, particularly with a conventional toothbrush having a rigid head, it can be difficult to reach all parts of the teeth in order to brush the teeth satisfactorily. It is also difficult with such brushes to maintain an optimum angle between the teeth and the head of the toothbrush for effective brushing and cleaning, necessitating continual repositioning of the brush in the hand throughout the brushing process. Consequently, there is a tendency to apply excess brushing pressure to some teeth and insufficient pressure to other teeth. The resultant combination of excess brushing pressure and inadequate cleaning or bad cleaning technique can result in damage to both teeth and gums.

Although angled-head toothbrushes have been suggested as an attempt to overcome some of these difficulties, they do not satisfactorily meet all the requirements.

Proposals have also been made for toothbrushes having flexible handles or flexible zones in their handles to assist in accommodating the orientation of the bristle-bearing head of the brush to the profile of an individual's teeth and gums. Such toothbrushes are disclosed for example in EP-A-0336641, U.S. Pat. No. 4,520,526, DE-OL-3640898, DE-OL-3612108, CH-0155730 and IT-485723.

In some circumstances it is desirable to further improve the flexibility of the head relative to the direction of the handle of the toothbrush.

Accordingly the present invention provides a toothbrush, having a handle and at one end thereof a bristle-bearing head, wherein the head is in the form of two or more segments flexibly and resiliently linked to each other and/or to the handle, one or more of the segments being bristle-bearing.

The toothbrush head of this invention, being flexible, can flex under the action of toothbrushing so as to accommodate itself to the differing profiles of individual users' teeth. In particular, teeth generally lie in a "C" shaped curve within the upper and lower jaw, the row of teeth consequently having a convex outer curve and a concave inner curve. The flexible head of the tooth-brush of the inventors can bend to accommodate itself to both the convex and concave curves of the teeth generally better than would be the case with a conventional rigid-headed toothbrush.

In a first embodiment of this invention, the head may be formed as an integral extension to the handle. In a second embodiment the handle may be extended into the form of a frame wholly or partly surrounding the head, and to which the head is linked, preferably flexibly and resiliently. Within such a frame the head may be integrally formed, or may be made as a separate part and fastened into the frame.

The head may be in a variety of segmented forms. For example in a first form, suitable both for when the head is formed as an integral extension of the handle or when the head is surrounded by a frame, the head may have bristles mounted in one face, and the opposite face may have one or more grooves therein. In such a head the lands between the grooves comprise the segments, and flexible resilient linking occurs about the thinned regions of head material at the bottom of the grooves.

In this first form of head, one or more of the grooves should be transverse to the longitudinal axis of the handle, to provide flexibility of the head in a plane containing this axis. Additionally or alternatively there may be one or more grooves aligned parallel to the longitudinal axis of the handle and/or one or more grooves aligned. Preferably there are only transverse grooves. Suitably there need be only one such transverse groove.

In this first form of head, the depth and/or width of the grooves, and/or the frequency of the grooves per unit distance, along the length and/or across the breadth of the head may be varied. By variation in this way the flexibility and/or resilience of linking and consequently of the whole head along the length and/or across the breadth of the head may be varied. For example by having deeper grooves at the end of the head furthest from the handle, the head can be made to be more flexible at this end. Preferably flexibility and/or resilience only along the length of the head is controlled in this way.

In this first, grooved, form of head, one or more of the grooves may be wholly or partly filled with an elastomeric material. In this way too the flexibility and/or resilience of the head may be varied and contamination of the grooves by for example toothpaste deposits etc may be reduced or avoided completely. The colour of the elastomeric material may be the same as that of the material of the head, or it may be different thereby achieving a distinctive striped or otherwise patterned appearance.

When the head is of the above described grooved form, and is wholly or partly surrounded by a frame, the frame preferably completely surrounds the head. The head may be linked to the frame handle at various points around the perimeter of the head, but is preferably linked to the frame at one or more points in a plane that includes the longitudinal axis of the handle. The head may alternatively or additionally be linked at points in a plane at 90° to the longitudinal axis of the handle. These links may be by bridging portions of the material of the head or frame, and by varying the dimensions of these bridging portions the degree of flexibility and/or resilience of the linking may be varied. For example the degree of flexibility and/or resilience of these links can be made such that the head may be made to rock about these links, in addition to flexing.

In a second segmented form for example, suitable for use when the head is surrounded by a frame, the head is in the form of one or more chains of bristle carriers, flexibly and resiliently linked to each other, and linked at least one end of the chain to the frame. The linking may be by bridging portions of the material of the head or frame, and by varying the dimensions the degree of flexibility and/or resilience of the linking may be varied.

In a third segmented form for example the head may be in the form of segments which are not joined to each other but are flexibly and resiliently linked to the handle or to the frame. In one such embodiment, the head may be in the form of segments linked to the handle or to the frame by thin spines, e.g., stalk-like bridging portions for example oriented inwordly from a surrounding frame. By varying the dimensions of these stalk-like bridging portions the degree of flexibility and/or resilience of the linking may be varied.

In all forms of the head in which a frame is present, the frame may bear bristles, which may have the same or different distribution, length, orientation, colour or stiffness to those on the head. Conveniently bristles when present on the frame may be shorter than those on the head.

The bristles may be uniformly distributed over the head, and the frame, if present, but preferably the bristles are distributed in discrete tufts. There may be one or more tufts per segment. In one embodiment of a head which is in the form of chains of linked bristle carriers, each carrier may carry one or two tufts of bristles.

In all forms of the toothbrush of this invention in Which there is a frame, the space(s) between the head and the frame may be partly or wholly filled with a flexible and/or resilient material, which may be an elastomeric material and/or may be in the form of a thin diaphragm. By varying the degree of such filling and the material used the degree of flexibility and/or resilience of the head may be varied.

The toothbrush (i.e. the handle, head and bristles) of the invention may be made of materials which are conventional in the manufacture of toothbrushes, especially plastics materials. Suitable plastics materials include, for example, polyamides and polypropylenes. An example of a suitable polyamide is the material 'Ultramid B3' (Trade mark, marketed by BASF, Federal Republic of Germany), having a modulus of elasticity (DIN 53452) of 3000. An example of a Suitable polypropylene is the material 'Novolene 1100 HX' (Trade mark, marketed by BASF, Federal Republic of Germany), which is a homopolymer and has a modulus of elasticity (DIN 53457) of 1400. Such a polypropylene homopolymer may optionally be used in admixture with a polypropyrene block co-polymer, such as the material 'Novolene 2500 HX' (Trade mark, marketed by BASF, Federal Republic of Germany), for example in an 80:20 mixture by weight (1100 HX: 2500 HX).

The handle may be of a shape which is conventional in the manufacture of toothbrushes. It may however be advantageously made in the form described in EP-0336641-A, the contents of which are included by reference, more particularly as described in column 1 lines 36"49 thereof.

In use, the toothbrush of this invention may be used for cleaning the teeth by an entirely conventional toothbrushing hand action, preferably in a manner recommended by dental health authorities. The toothbrush of the invention may also be used in electrically driven toothbrushes.

The invention will now be described by way of example only, with reference to the accompanying drawings, in which:

FIG. 1 shows a toothbrush head integral with the handle and divided into segments by grooves.

FIG. 2 shows a toothbrush head divided into segments by grooves, and within a frame extension of the handle.

FIG. 3 shows a variant of the head of FIG. 2 in which the head is divided into 2 segments by a single groove.

FIG. 4 shows a toothbrush head in the form of a chain of linked bristle carriers within a frame extension of the handle.

FIG. 5 shows a toothbrush head in the form of segments linked to a frame extension of the handle by stalk-like bridging portions.

Referring to FIGS. 1A, 1B, 1C, and 1D, a toothbrush head (11) is formed integrally at one end of a handle (12). The head (11) and handle (12) are shown in an underside view in FIG. 1A, in a top view in FIG. 1B and in longitudinal section about the line A—A in FIGS. 1C and 1D.

The head (11) has two substantially parallel faces, and in a top face are mounted bristles distributed in a plurality of tufts (13). The lower face is divided by a series of parallel grooves (14) transverse to the longitudinal axis A—A of the handle, into segments (15) being the lands between the grooves (14), leaving a thinned and consequently flexible and resilient region of head material (16) at the bottom of the grooves (14). The bristles (13) are mounted in these segments (15).

In FIGS. 1C and 1D the depth of the grooves (14) is shown to decrease in the direction towards the handle (12), the deepest grooves being closest to the end of the head furthest from the handle. This results in graded flexibility of the head (11), the part of the head (11) furthest from the handle (12) being the more flexible by virtue of the thinner head material (16) at the bottom of the grooves (14) in this area.

In FIGS. 1E and 1F the grooves (14) are partly filled with an elastomeric material (17), which is of a different colour to the head material, imparting a striped appearance to the underside of the head.

In FIGS. 1D and 1F the head (11) is shown as flexing under the application of pressure at the point indicated by the arrow, into a convex curve of bristle tufts (13), accommodating itself to the curve of the inner side of the line of the teeth to assist thorough cleaning, whilst its resilience assists gentle cleaning.

Referring to FIGS. 2A, 2B, 2C, 2D, 2E, 2F and 2G, a toothbrush head (21) is surrounded by a frame (22) extension integrally formed at one end of a handle (23), which are shown in an underside view in FIG. 2A, in a top view in FIG. 2B, in sections about the line A—A in FIGS. 2C, 2E and 2G, in a cross section about the line B—B in FIG. 2D, and in an overall side view in FIG. 2F.

The head (21) is flexibly and resiliently linked to the frame (22) by bridging portions (24) of thin head/handle material, at two points in line with the longitudinal axis of the head (21) and frame (22), the upper part of which may be closed with a thin diaphragm (not shown) of elastomeric material.

The head (21) has a construction similar to that of the head shown in FIG. 1, i.e. it has two substantially parallel faces, in a top face being mounted tufts (26) of bristles, the lower face being divided into segments (27) by lateral grooves (28).

In FIG. 2G, the grooves (28) are shown as being partly filled with an elastomeric material (29) of a different colour to that of the head material, imparting a striped appearance to the underside of the head (21).

In FIGS. 2D and 2E the head (21) is shown as flexing under the application of pressure of the point indicated by the arrow in FIG. 2E, into a concave curve of bristle tufts (26), accommodating itself to the outer side of the line of teeth. Furthermore the ability of the head (21) to flex in this concave manner contributes to a gentle tooth-cleaning action. In FIG. 2D the application of pressure of the point indicated by the arrow has resulted in rocking of the head (21) about the axis between the two bridging portions (24), to assist in accommodating the head (21) to the shape and orientation of the teeth.

Referring to FIGS. 3A, 3B, 3D, 3E and 3F, a toothbrush head (31) is surrounded by a frame (32) extension integrally formed with a handle (33) which are shown in an underside view in FIG. 3A, in a top view in FIG. 3B, in a longitudinal section about the line A—A in FIGS. 3C, 3D and 3F and in an overall side view in FIG. 3E.

The head (31) is flexibly and resiliently linked to the frame (32) by bridging portions (34) of thin head/handle material, at two regions in line with the longitudinal axis of the head (31), leaving a narrow gap (35) between the head (31) and frame (32), the upper part of which may be closed with a thin diaphragm (not shown) of elastomeric material.

The head (31) has a construction similar of that of the head of FIG. 2, with an upper face having tufts (36) of bristles mounted therein. The lower face is divided into two segments (37) by a single lateral groove (38).

In FIG. 3F, the single lateral groove (38) is shown partly filled with an elastomeric material (39) of a colour different to that of the head material, imparting a striped appearance to the underside of the head (31).

In FIG. 3D, the head (31) is shown as flexing under the application of pressure at the point indicated by the arrow into a concave fold of bristle tufts (36) accommodating itself to the outer side of the line of the teeth.

The two bridging portions (34) are wider than those shown in FIG. 2, and hence the head (31) does not so readily undergo rocking motion about these bridging portions (34) as does the head of FIG. 2.

Referring to FIGS. 4A, 4B, 4C, 4D, 4E and 4F, a toothbrush head (41) is surrounded by a frame (42) extension of a handle (43), which are shown in an underside view in FIG. 4A, in a top view in FIGS. 4B and 4F, in longitudinal section about line. A—A in FIGS. 4C and 4D and in an overall side view in FIG. 4E.

The head (41) is in the form of a series of bristle carriers (44) which are flexibly and resiliently linked by thin bridging portions (45) to each other and to the frame (42). The bristle carriers (44) carry one or two tufts (46) of bristles. More tufts (47) of bristles are mounted on the frame (42) in an outer ring of tufts (47) which are shorter than tufts (46).

Within frame (42) there is a space (48) around the chain of bristle carriers (44), which in FIG. 4F is shown filed with an elastomeric material (49) which is of a different colour to that of the frame (42) and bristle carriers (44).

In FIG. 4D the head (41) is shown as flexing under the application of pressure at the point indicated by the arrow in FIG. 4D into a concave curve of tufts (46) accommodating itself to the outer side of the line of the teeth. The linking of individual tufts (46) in this way assists towards a very gentle tooth cleaning action.

Referring to FIGS. 5A, 5B, 5C, 5D, 5E, 5F and 5G, a toothbrush head (51) is surrounded by a frame (52) extension of a handle (53), which are shown in an underside view in FIG. 5A, in a top view in FIGS. 5B and 5F, in longitudinal section view about line A—A in FIGS. 5C, 5E and 5G, and in a cross sectional view in FIG. 5D. The overall sideways appearance of this toothbrush is identical to FIG. 2F.

The head (52) is in the form of a series of segments (54), which are flexibly and resiliently linked by stalk-like portions (55) to the frame (52), leaving a narrow gap (56) between the head (51) and the frame (52), and between the segments (54). The segments (54) carry one or more tufts (57) of bristles.

In FIGS. 5F and 5G the gap (56) is shown as being partly filled with an elastomeric material (58) which is of a different colour to that of the segments (54) and the frame (52).

In FIGS. 5D and 5E the head (51) is shown as flexing under the action of pressure of the point indicated by the arrow into a concave curve of tufts (57) accommodating itself to the outer side of the line of the teeth.

I claim:

1. A toothbrush comprising a handle, and at one end thereof, a bristle-bearing head made of plastics material having a face and an opposite face, the head having at least two segments flexibly and resiliently linked to each other and having at least one of the segments being bristle bearing, the head having bristles mounted on one face of the head and the opposite face of the head having at least one groove formed therein, each of said at least one groove being formed between the segments such that the segments form a land on either side of a groove, and each groove containing an elastomeric material different from said plastics material.

2. A toothbrush according to claim 1 wherein said at least one groove is aligned transverse to the longitudinal axis of the toothbrush.

3. A toothbrush according to claim 1 wherein the toothbrush comprises only one groove.

4. A toothbrush according to claim 1 wherein the depth of said at least one groove, width of said at least one groove, or the frequency per unit distance of said at least one groove along the length or across the width of the head, varies with distance along the head.

5. A toothbrush comprising a handle, and at one end thereof, a bristle bearing head made of plastics material having a face from which bristles extend and an opposite face, the head comprising at least two segments flexibly and resiliently linked to each other and having at least one of the segments being bristle bearing, the head having bristles mounted on one face of the head and the opposite face of the head having at least one groove formed therein, each of said at least groove being formed between the segments such that the segments form a land on either side of a groove, and each groove containing an elastomeric material, the head further including a frame integral to the handle and wholly surrounding the segments whereby at least one space is formed between the frame and the segments, said at least one space containing a flexible and resilient material therein.

6. A toothbrush according to claim 5 wherein the head is linked to the frame in at least one point within a plane that includes the longitudinal axis of the toothbrush.

7. A toothbrush according to claim 5 wherein the head is linked to the frame in at least one point within a plane which is 90 degrees to the longitudinal axis of the toothbrush.

8. A toothbrush according to claim 5, wherein said at least one space between the frame and the segments contain a flexible and resilient thin diaphragm.

9. A toothbrush according to claim 5 wherein said at least one space between the frame and the segments contain a flexible and resilient elastomeric material.

10. A toothbrush comprising a handle, and at one end thereof, a bristle bearing head made of plastics material having a face from which bristles extend and an opposite face, the head comprising at least two segments flexibly and resiliently linked to each other and having at least one of the segments being bristle bearing, the head further including a frame integral to the handle, stalk-like bridging portions extending inwardly from said frame to the segments for linking said segments to said frame, whereby spaces are formed between the segments, and between the segments and the frame, and said spaces containing an elastomeric material.

11. A toothbrush comprising a handle, and at one end thereof, a bristle bearing head made of plastics material having a face from which bristles extend and an opposite face, the head comprising at least two segments flexibly and resiliently linked to each other and having at least one of the segments being a bristle carrier, the head further including a frame integral to the handle, said head comprising at least one chain of bristle carriers being flexibly and resiliently linked to each other and being linked at least at one end to said frame, said head having at least one space being formed between the frame and said at least one chain of bristle carriers, said at least one space being filled with a flexible and resilient material.

12. A toothbrush according to claim 5, 10 or 11 including bristles borne by and extending from the frame.

* * * * *